United States Patent Office 3,520,431
Patented July 14, 1970

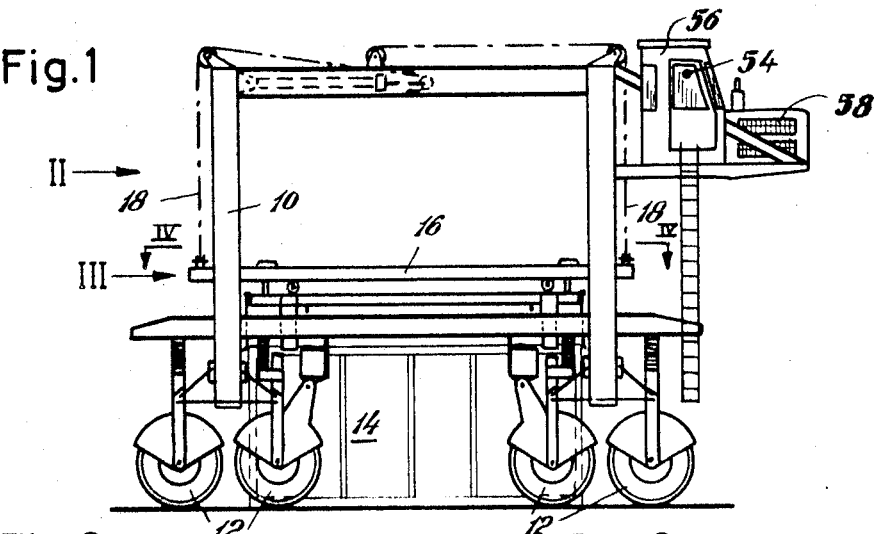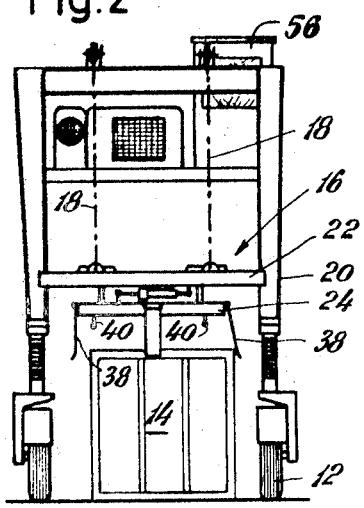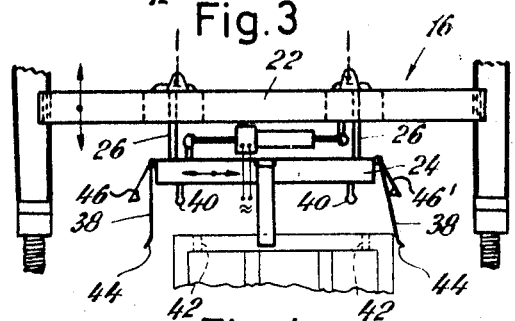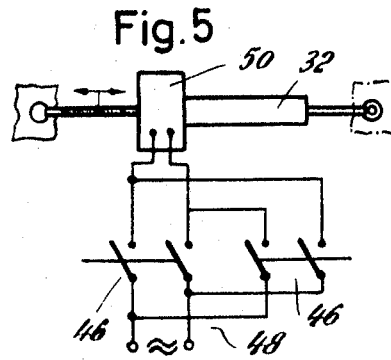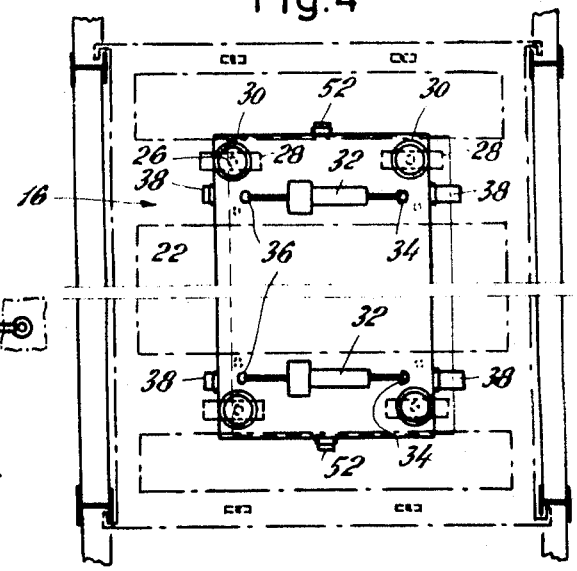
INVENTOR.
HANS TAX
AGENTS

3,520,431
CONTAINER TRANSPORTING VEHICLE
Hans Tax, 3 Potsdamer Strasse, 8 Munich 23, Germany
Filed Sept. 30, 1968, Ser. No. 763,544
Claims priority, application Germany, Oct. 3, 1967,
1,556,279
Int. Cl. B66f 7/62
U.S. Cl. 214—394           9 Claims

ABSTRACT OF THE DISCLOSURE

A gantry-type transporting vehicle for containership containers has a two-part lifting frame. A first frame part is attached to hoisting cables and guided on the vehicle body during vertical movement. The second frame part is pivotally suspended from the first part and may be shifted transversely of the direction of vehicle movement and turned somewhat about a vertical axis by two electrically operated jacks controlled by sensing blades on the second part through a feedback circuit to align coupling elements on the frame part and on a container to be lifted.

BACKGROUND OF THE INVENTION

This invention relates to transporting vehicles for large shipping containers of rectangularly prismatic shape of the type commonly used on containerships, and particularly to the hoisting devices normally found on such vehicles.

Known transporter vehicles for such containers have a body similar to that of a gantry crane and traveling on wheels. The body is of inverted U-shape in upright section transversely to the normal direction of travel so as to define a downwardly open passage therethrough. A lifting frame can be raised and lowered in the passage on guides and is equipped with coupling elements arranged in a standard pattern for engagement with cooperating coupling elements on the top of a container when the vehicle straddles the container, and the latter is received in the vehicle passage in proper alignment. The operator's cab is normally located outside the passage near the front top of the vehicle, and the operator's view toward the container to be lifted is partly obstructed by the lifting frame and other elements of the vehicle. It is therefore somewhat difficult for the operator to align the lifting frame of the known vehicle for coupling with a container in the passage. Misalignment in the direction of normal or longitudinal vehicle movement is corrected quickly enough, but transverse misalignment can be made up only by moving the vehicle back and forth and sometimes repeating this procedure several times.

An object of the invention is the provision of an improved lifitng frame which facilitates alignment between the coupling elements on the lifting frame and on the container, and preferably aligns them automatically when the lifting frame is lowered to the top of the container.

SUMMARY OF THE INVENTION

The improved lifting frame of the invention has two parts or decks of which the first is guided on the supporting body structure of the vehicle during raising and lowering of the frame. The second frame portion which carries the coupling element is fastened to the guided frame portion for joint vertical movement actuated by hoisting cables attached to the first or second frame portion. The second frame portion can be shifted by a power-operated mechanism relative to the first frame portion horizontally and transversely of the direction of normal vehicle movement, a sensing device on the second frame portion can sense the position of a container to be shifted, and a feedback arrangement connects the sensing device to the shifting mechanism so that the second frame portion is moved by the shifting mechanism toward a position of vertical alignment with the sensed container.

The sensing device is preferably equipped with means for sensing the angular position of the container relative to the normal direction of vehicle movement, and the shifting mechanism may be provided with means for turning the second frame portion relative to the first frame portion about a vertical axis.

A very convenient shifting mechanism capable of the afore-described modes of operation includes two power-operated jacks spaced in the direction of vehicle movement, and each fastened to respective parts of the two frame portions which are offset relative to each other transversely of this direction.

The sensing mechanism may include two pairs of sensing members spaced in the direction of vehicle movement, the members of each pair being transversely spaced from each other, and each sensing member depending from a pivot on the second frame portion for movement about a pivot axis extending in the direction of vehicle movement. The free lower end portion of each sensing member has an obliquely inclined cam face oriented in such a manner that it flares downwardly away from the cam face of the other sensing member in the pair. The feedback arrangement includes switches in a control circuit for the shifting mechanism. The switches are operated by respective sensing members when the latter sense a container and are thereby pivoted out of their normal positions.

Similar sensing elements may be arranged on the transverse front and rear edges of the first or second frame for sensing alignment with the container in the direction of vehicle movement, and cooperate with switches in the energizing circuits of pilot lamps in the operator's cab.

Other features, additional objects, and many of the attendant advantages of this invention will readily be appreciated as the same becomes better understood by reference to the following detailed description of a preferred embodiment when considered in connection with the annexed drawing.

BRIEF DESCRIPTION OF THE DRAWING

In the drawing:

FIG. 1 shows a container transporting vehicle of the invention in side elevation;

FIG. 2 illustrates the vehicle of FIG. 1 in rear elevation taken in the direction of the arrow II;

FIG. 3 shows a portion of the same vehicle in rear elevation taken on a larger scale in the direction of the arrow III in FIG. 1;

FIG. 4 shows the vehicle in fragmentary plan section on the line IV—IV in FIG. 1, the upper deck of the lifting frame being shown in phantom view; and FIG. 5 shows a detail of the device of FIG. 3 with an associated feedback circuit.

DESCRIPTION OF THE PREFERRED EMBODIMENT

Referring now to the drawing in detail, there is seen a vehicle for transporting large shipping containers whose gantry-shaped supporting body 10 consists of a framework of heavy welded steel beams which has the shape of an inverted U when viewed endwise or in section transverse to the normal or longitudinal direction of vehicle movement. The four lower corners of the frame 10 are equipped with wheels 12 driven by individual motors, not shown.

In the drawing, the frame 10 straddles a container 14 having a rectangular prismatic shape and dimensions which are standardized by worldwide agreements. A lifting frame 16 is suspended on the body 10 above the container 14 from cables 18 of a hoisting mechanism, conventional in itself and not otherwise shown. The frame 16 is guided during its vertical movement by conforming engagement of portions of upright body members 20 and of an upper horizontal deck 22 of the frame 16.

The frame has a second or lower deck 24 connected with the upper deck 22 by four tie rods 26 near the four corners of the elongated rectangular lower deck. The tie rods are fixedly fastened to the lower deck and pass through oversized transverse slots 28 in the upper deck 22. The upper end of each tie rod 26 carries a circular disc 30 whose diameter is much greater than the width of the corresponding slot 28, so as to suspend the lower deck 24 from the upper deck 22 by the tie rods 26.

The axes of two electrically powered screw jacks 32 are parallel to each other transversely of the direction of vehicle movement and spaced in that direction between the two decks 22, 24. The two ends of each jack are respectively attached to a stud 34 pivotally mounted below the upper deck 22 and to a stud 36 pivotally mounted on the lower deck 24.

Four resilient sensing blades 38 are pivoted to the lower deck 24 near the front and rear ends of the long edges of the deck and swing about longitudinal pivot axes. They normally hang straight down under their own weight.

Coupling pins 40 depend from the underside of the frame deck 24 in a standardized pattern for coupling engagement with corresponding recesses 42 in the top wall of the container 14. In the illustrated position of the vehicle and of the container 14, the pins 40 are laterally misaligned with the recesses 42.

The free lower ends of the blades 38 have cam faces 44 which are obliquely inclined in a vertical transverse plane so that, in each pair of transversely opposite blades 38, the cam face 44 of each blade flares downwardly away from the corresponding cam face 44 on the other blade. The normal transverse spacing of the blades 38 is equal to the width of the container 14 to be lifted. Because of the illustrated misalignment between the container and the vehicle frame 10, the cam faces 44 of the sensing blades 38 on the right side of the vehicle, as viewed in FIG. 3, were engaged by a top edge of the container 14 during the lowering of the frame 16 by the hoisting cable 18. Normally open switches 46, 46' are associated with the blades 38 in such a manner as to be closed by the blades when the latter are pivoted from their normal positions, and the switches 46' on the right vehicle side are therefore closed.

As is shown in FIG. 5, each switch 46 and the switch 46' at the transversely opposite corner of the deck 24 are arranged in the energizing circuit 48 of the reversible electric motor 50 for one of the jacks 32, the connection being such that the jack is expanded when the switch 46 is closed, and contracts when the switch 46' is closed. In the illustrated condition of FIG. 3, the closing of both switches 46' causes both jacks 32 to be contracted, whereby the lower deck 24 is shifted toward the right until the switches 46' open when the pins 40 are aligned with the recesses 42.

As is inherent in this arrangement, diagonally opposite switches 46, 46' respectively associated with different jacks 32 are closed if the lower deck 24 is angularly misaligned with the container 14. One of the jacks 32 is thereby expanded and the other simultaneously contracted so that the lower deck 24 is turned about a vertical axis relative to the upper deck 22. The angular displacement is limited by the clearance of the tie rods 26 in the slots 28, but is adequate for the relatively small angles involved.

Additional sensing blades 52 and associated switches (not shown) are centered in the front and rear edges of the lower deck 24 and pivot about transverse horizontal axes. The non-illustrated associated switches are normally open, and close when the blades are deflected by the top of a longitudinally misaligned container 14. The switches associated with the blades 52 are in the energizing circuits of pilot lamps 54 in the operator's cab 56 which is perched on a high platform at the front end of the frame 10 together with the engine 58 of the vehicle. The sensing blades 52 may also be mounted on the upper deck 22 if so desired.

While it is normally preferred to attach the cables 18 to the guided upper deck 22, it is possible to suspend the lower deck 24 directly from the cables and to shift the suspended deck relative to the deck 22 which is guided in a fixed path on the vehicle body 10. It is also contemplated to reverse the vertical positions of the guided deck and of the deck which carries the coupling pins, the latter extending downward through openings in the guided deck. Other variations will readily suggest themselves to those skilled in the art.

What is claimed is:

1. In a transporting vehicle for containers having an inverted U-shape in section transverse to the direction of normal vehicle movement so as to define a passage extending therethrough in said direction, a lifting frame, hoisting means for raising and lowering said frame in said passage, and coupling means on said frame for coupling the frame to the top of a container to be transported after the frame has been lowered on said container by said hoisting means, the improvement in the lifting frame which comprises:

(a) a first frame portion;
(b) guide means on said vehicle for guiding said first frame portion during said raising and lowering;
(c) a second frame portion carrying said coupling means,
 (1) said hoisting means being secured to one of said frame portions;
(d) fastening means fastening said two frame portions to each other for joint vertical movement during said raising and lowering;
(e) power-operated shifting means for shifting said second frame portion relative to said first frame portion horizontally transverse of said direction;
(f) sensing means on said second frame portion for sensing the position of the container to be lifted; and
(g) feedback means connecting said sensing means and said shifting means for movement of said second frame portion by said shifting means toward a position of vertical alignment with said sensed container.

2. In a vehicle as set forth in claim 1, said sensing means including means for sensing the angular position of said container relative to said direction, and said shifting means including means for angularly shifting said second frame portion relative to said first portion about a vertical axis.

3. In a vehicle as set forth in claim 2, said power-operated shifting means including two jack means spaced in said direction, each jack means being fastened to respective parts of said frame portions, said parts being offset relative to each other transversely of said direction.

4. In a vehicle as set forth in claim 1, said sensing means including two pairs of sensing members, said pairs being spaced from each other in said direction, and the members of each pair being spaced from each other transversely of said direction.

5. In a vehicle as set forth in claim 4, said sensing members depending from said second frame portion and being movable relative to the same, each sensing member having a cam face obliquely inclined relative to a horizontal plane, the cam faces of the members of each pair flaring away from each other in a downward direction.

6. In a vehicle as set forth in claim 5, a plurality of pivots having respectively axes extending in said direction of normal vehicle movement and fastening respective sensing members to said second frame portion.

7. In a vehicle as set forth in claim 4, said feedback means including a control circuit for controlling said shifting means, said circuit including a switch on said second frame portion associated with each of said sensing members for operation thereby in response to pivotal movement of the associated sensing member.

8. In a vehicle as set forth in claim 1, two pivots oppositely spaced on one of said frame portions from said coupling in said direction, said pivots having respective horizontally extending axes transverse of said direction, a sensing member depending from each of said pivots, the lower terminal portion of each sensing member having a cam face obliquely inclined relative to a horizontal plane and flaring downwardly away from the cam face of the other sensing member, and indicator means operatively connected to said sensing members for generating a perceptible signal in response to pivotal movement of each sensing member about the axis of the associated pivot.

9. In a vehicle as set forth in claim 1, said hoisting means being attached to said first frame portion, and said second frame portion depending from said first portion by said fastening means.

References Cited

UNITED STATES PATENTS

| | | |
|---|---|---|
| 2,803,356 | 8/1957 | Thomas. |
| 3,078,115 | 2/1963 | Harlander et al. |
| 3,151,904 | 10/1964 | Tantlinger et al. |

ALBERT J. MAKAY, Primary Examiner

U.S. Cl. X.R.

294—67